US010812521B1

(12) United States Patent
Sharifi Mehr

(10) Patent No.: US 10,812,521 B1
(45) Date of Patent: Oct. 20, 2020

(54) SECURITY MONITORING SYSTEM FOR INTERNET OF THINGS (IOT) DEVICE ENVIRONMENTS

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 253 days.

(21) Appl. No.: 16/100,695

(22) Filed: Aug. 10, 2018

(51) Int. Cl.
*H04L 29/06* (2006.01)

(52) U.S. Cl.
CPC .......... *H04L 63/1433* (2013.01); *H04L 63/20* (2013.01)

(58) Field of Classification Search
CPC . H04L 63/1433; H04L 63/20; H04L 63/1425; H04L 63/1416; H04L 63/14; G06F 21/577
See application file for complete search history.

(56) References Cited

U.S. PATENT DOCUMENTS

| | | | | |
|---|---|---|---|---|
| 9,654,485 | B1 * | 5/2017 | Neumann | H04L 63/1416 |
| 10,084,809 | B1 * | 9/2018 | Rambo | G06F 8/65 |
| 10,104,100 | B1 * | 10/2018 | Bogorad | H04L 63/1425 |
| 2018/0131716 | A1 * | 5/2018 | Chantz | H04L 63/1441 |
| 2018/0375955 | A1 * | 12/2018 | Ferenczi | H04L 63/102 |
| 2020/0014711 | A1 * | 1/2020 | Rego | H04L 63/1433 |

OTHER PUBLICATIONS

Antonakakis M., et al., "Understanding the Mirai Botnet," Proceedings of the 26th USENIX Security Symposium (2017), retrieved from https://static.googleusercontent.com/media/research.google.com/en//pubs/archive/46301. pdf, Aug. 16-18, 2017, 19 pages.
GitHub, "IoT Malware," downloaded from https://github.com/ifding/iot-malware, May 30, 2017, 2 pages.
GitHub, "Telnet IoT Honeypot," retrieved from https://github.com/Phype/telnet-iot-honeypot, Jan. 12, 2018, 4 pages.
Gu G., et al., "BotSniffer: Detecting Botnet Command and Control Channels in Network Traffic," Proceedings of the Network and Distributed System Security Symposium, NDSS Symposium 2008, retrieved from http://faculty.cs.tamu.edu/guofei/paper/Gu_NDSS08_botSniffer.pdf,Feb. 10-13, 2008, 18 pages.

* cited by examiner

*Primary Examiner* — Ali S Abyaneh
(74) *Attorney, Agent, or Firm* — Nicholson De Vos Webster & Elliott LLP

(57) ABSTRACT

Techniques are described for implementing a security service that can be used to monitor and provide security-related information for Internet of Things (IoT) devices. An IoT security service uses a reference framework to model the progressive stages of IoT security attacks, also referred to herein as an IoT kill chain. Each stage of an IoT kill chain is associated with a set of security threat "facilitators" and/or security threat "indicators." Facilitators represent characteristics of an IoT device that cause the device to be susceptible to various types of security threats, while indicators represent detected device activity indicating a potential ongoing security attack. An IoT security service collects data from IoT devices being monitored and possibly other related components, analyzes the collected data to detect defined facilitators and indicators, and uses the detected facilitators and indicators to calculate various security scores for individual devices or for groups of devices.

20 Claims, 8 Drawing Sheets

SECURITY MONITORING SYSTEM FOR INTERNET OF THINGS (IOT) DEVICE ENVIRONMENTS

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Figure 1:
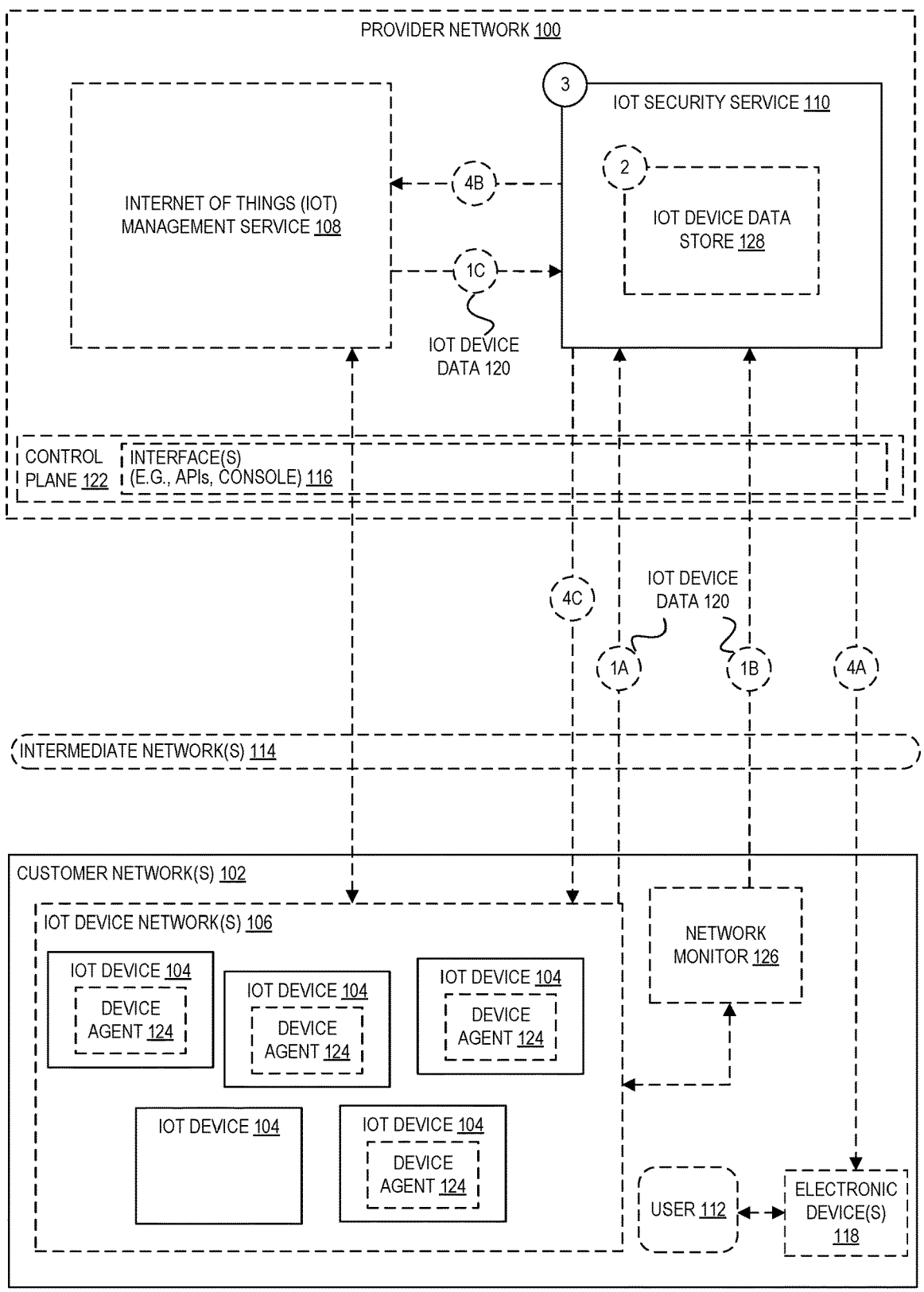
FIG. 1 is a diagram illustrating a networked computer environment including an Internet of Things (IoT) security service that can be used to monitor and provide security-related information for Internet of Things (IoT) devices according to some embodiments.

Various embodiments of methods, apparatus, systems, and non-transitory computer-readable storage media are described for implementing a security service that can be used to monitor and provide security-related information for Internet of Things (IoT) devices. According to embodiments described herein, an IoT security service uses a reference framework to model the progressive stages of IoT security breaches, also referred to herein as an IoT kill chain. In an embodiment, each stage of an IoT kill chain used by the IoT security system is associated with a set of security threat "facilitators" and security threat "indicators." As described in more detail hereinafter, security threat facilitators generally represent characteristics of an IoT device that cause the device to be susceptible to various types of security threats, while security threat indicators represent detected device activity that indicates a potential occurrence of an ongoing security attack.

The IoT concept connects the physical world to the internet, for example, by enabling virtually any type of device to collect data and to communicate with a network to share the collected data. Connecting new types of "things" to the internet is possible because many different connectivity options are now available, more devices are capturing data and more detailed types of data, and the cost of connecting a wide range of computing devices to the internet is declining. As a result, many different types of "things" are being used in IoT applications, including consumer products such as security cameras, internet modems, cable set-top boxes, and refrigerators; industrial systems such as conveyor belts and manufacturing equipment; and commercial devices such as traffic signals and smart meters. In general, any type of device that can be powered on can potentially become part of an IoT application.

The growth of IoT-based applications is valuable in part because it makes previously unusable data available for analysis and other types of processes. These new data sources allow users to visualize, explore, and build sophisticated analytics using machine learning (ML) and other techniques in the cloud and elsewhere. IoT applications can also run on devices so they can respond in real-time as events unfold.

As the number of use cases and availability of IoT devices has increased, so too has the frequency and types of security attacks against such devices. There are several aspects of IoT environments that render existing security solutions insufficient to address many current security challenges. For one, many types of IoT devices have processing and memory resource constraints that limit the types of security-related software that can be installed on the devices. Another issue is the fragmented ownership of many types of deployed IoT devices, both in terms of the devices themselves and ownership of the devices' security. For example, consider internet modems which can be owned/controlled by an internet service provider (ISP) and/or by individual service subscribers. As another example, a grocery store may own and use a set of IP connected cameras but use outsourced support to manage the devices' operation and security. Furthermore, many different parties may be involved in the life cycle of such devices from manufacturing and installation to use and management of the devices. This often results in a disparate set of software applications and tools available to operate and manage the devices.

The fragmented ownership of such devices particularly makes security threat detection and remediation tasks challenging. For example, if it is detected that a grocery store's IP connected cameras are experiencing a security attack, there may not be a person that is readily in a position to patch the camera software or perform other remediating steps, and there is often no standard way to interface with the devices to remotely kill or patch the devices either. The wide range of IoT devices types also run many different operating systems (OS) and other software platforms which makes it challenging to push updates consistently. The integration of IoT applications into so many different types of devices also makes it more difficult for device owners to even determine if their devices are vulnerable to security attacks. The downward pressure on manufacturing costs of such devices also means that device security is often not a high priority. Another issue is the wide range of IoT security threats and rapidly changing threat landscape. Many existing security solutions use various pattern-based techniques to attempt occurrences of known types of security threats. However, these types of pattern-based solutions are generally unable to identify "zero-day" exploits or other types of security threats where the attack pattern/vulnerability is unknown or unpredictable.

According to embodiments described herein, an IoT security service collects data from IoT devices being monitored and possibly other related components, analyzes the collected data to detect defined facilitators and indicators associated with an IoT kill chain, and uses the detected facilitators and indicators to continuously or periodically calculate at least two scores for individual devices or for groups of devices: a security threat level score and a security breach likelihood score. A security threat level score for a device, for example, can be calculated based on the detected presence of security threat facilitators (for example, the identification of open network ports, use of default passwords, and so forth) and, optionally, the accessibility and impact level of the detected facilitators and potentially other information related to known ongoing targeted or mass attack campaigns that involve the detected facilitators. The breach likelihood score is calculated based on the detected presence of security threat indicators and, optionally, recent threat level score(s), an associated confidence level and impact level of the detected security threat indicators, historical observations, and corresponding breach stages. In an embodiment, the calculated scores can be used to generate security alerts (for example, in response to a calculated breach likelihood score exceeding a defined threshold) and audit check alerts (for example, in response to a calculated threat level score exceeding a defined threshold). Furthermore, users can use the IoT security system to request and gain insight into the factors that are used to calculate the threat level and breach likelihood scores (for example, the identified facilitators and indicators).

The combined top-down (for example, based on summary breach likelihood scores and threat level scores) and bottom-up visibility (for example, based on indications of the facilitators and indicators from which the scores are derived) can guide IoT device owners in their security monitoring, triage, and incident response activities. For example, a security system providing only summary information may lack actionability due to absence of associated "ground truth" information indicating why one or more devices are insecure, while a security system providing only security alerts and audit check failures can result in alert fatigue due to false positives and lack of urgency information. Additionally, the ability to correlate and combine recently identified facilitators and indicators within a lookback time window helps to not lose the value of otherwise seemingly minor facilitators and low-confidence indicators so as to not miss slow-paced security attacks.

FIG. 1 is a diagram illustrating a networked computer environment including an Internet of Things (IoT) security service that can be used to monitor and provide security-related information for Internet of Things (IoT) devices. In some embodiments, a customer network 102 includes IoT devices 104. For example, the IoT devices 104 may be a set of security cameras, a deployed set of sensors, or a disparate set of IoT devices. Although the IoT devices depicted in FIG. 1 are shown as part of a same IoT device network 106 in a larger customer network 102, in general, the IoT devices 104 can be spread across any number of separate IoT device networks and/or customer networks. In some embodiments, an IoT management service 108 and an IoT security service 110 operate as part of a service provider network 100 and each comprise one or more software modules executed by one or more electronic devices at one or more geographic locations and data centers managed by the service provider. Although the IoT security service 110 is shown as part of a service provider network 100 in FIG. 1, embodiments described herein can be implemented by a standalone IoT security application installed in a customer network 102 or elsewhere, or implemented by any other types of application or service that can access data collected from IoT devices 104. For example, a customer might prefer for data collected from their IoT devices 104 not to leave their own customer network for privacy, security, or any other reason, and instead prefer to collect and analyze the data within the customer network or at another location.

A provider network 100 provides users with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage), network-related resources (for example, configuring virtual networks including groups of compute resources, content delivery networks (CDNs), Domain Name Service (DNS)), application resources (for example, databases, application build/deployment services), etc. These and other computing resources may be provided as services, such as a hardware virtualization service that can execute compute instances, a storage virtualization service that can store data objects, etc. The users (or "customers") of provider networks 100 (for example, a user 112) may utilize one or more user accounts that are associated with a customer account, though these terms may be used somewhat interchangeably depending upon the context of use. Users may interact with a provider network 100 across one or more intermediate networks 114 (for example, the internet) via one or more interface(s) 116, such as through use of application programming interface (API) calls, via a console implemented as a website or application, and so forth. The interface(s) 116 may be part of, or serve as a front end to, a control plane 122 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As indicated above, it is often desirable for users 112 related to one or more customer network(s) 102 that include IoT devices 104 to manage the security of the devices. For example, a user 112 may own the IoT devices 104 or otherwise be responsible for maintaining the security of the IoT devices 104. In an embodiment, at one or more of circles "1A," "1B," and "1C," IoT device data 120 is collected from IoT devices 104 in a customer network 102 and/or from related components and sent to an IoT security service 110 for analysis. The IoT device data 120 that is collected can include both device profile data (for example, data related to device configurations, settings, running processes, device types, or any other characteristics of a device) and device activity data (for example, data indicating various types of processing or network activity that involves a device).

In one embodiment, to configure an IoT security service 110 to collect IoT device data, a user 112 creates an account or uses an existing account associated with the provider network 100, associates one or more IoT devices 104 with the user's account, and configures one or more methods for collecting IoT device data 120 from the devices. For example, a user 112 may use an electronic device 118 to access a web-based console, command line interface (CLI), or any other interface provided by an IoT security service to register one or more IoT devices 104 with the IoT security service 110. The identification of IoT devices can be based on IP addresses associated with the devices (if the addresses are public and the devices are not behind a proxy) or using any other identifiers of the devices.

As indicated above, IoT device data 120 can be collected from IoT devices 104 using one or more of: on-device agents, in-network monitors, global device monitors, other IoT-related services, and so forth. For example, as shown at circle "1A" in FIG. 1, in some cases on-device agents 124 can be used installed on IoT devices 104 and used to periodically or continuously collect various types of device profile data (for example, indicating services running on a device, configurations and settings on the device, device identifying information, and so forth) and various types of device activity data (for example, log data generated by applications running on the device, network activity data, and so forth).

As shown at circle "1B," in other examples, one or more network monitors 126 (for example, network traffic and entry point scanners) can be used to collected information directly and/or indirectly from IoT devices 104 to which the network monitors 126 have network accessibility. For example, the network monitors 126 can probe IoT devices 104 for information, monitor network traffic flowing to and from IoT devices, and so forth.

At circle "1C," in some embodiments, one or more IoT devices 104 may be configured to communicate with a separate IoT management service 108 and device configuration information, information related to requests sent to and from various IoT devices 104, and other types of IoT device data 120 can be obtained by an IoT security service 110 indirectly from the IoT management service 108. In an embodiment, an IoT management service 108 generally enables users to easily and securely connect and manage any number of IoT devices. The IoT management service 108 can also gather data from IoT devices, run analytics on the devices (for example, to analyze operational information about the devices) and to take actions relative to a fleet of devices (for example, to reboot devices, send software updates, change device configurations, and so forth). In other embodiments, IoT device data 120 can also include other types of "global" data that may be applicable to some or all of the IoT devices 104. For example, these types of global data can include data collected from audit and device management applications, other security and logging applications, device manufacturers, and any other sources of information related to the IoT devices 104. The collected IoT device data 120 can include both local signals (for example, data that is collected by directly interacting with IoT devices 104) and global signals (data that is collected without directly interacting with IoT devices 104), and the local signals and global signals can be correlated. Another option for collecting data from IoT devices 104 involves the use of honeypots to observe the devices and interactions among the devices. Using the honeypots with network access to IoT devices 104, for example, the devices' IP addresses can be identified and used and monitor patterns of activity.

In an embodiment, at circle "2," the IoT security service 110 optionally stores the IoT device data 120 collected at any of circles "1A," "1B," and "1C" for subsequent processing and analysis. For example, an IoT security service 110 may store the data collected from or otherwise relating to the IoT devices 104 in an IoT device data store 128, which can include any of a relational database, an object-oriented database, a NoSQL database, files, or any other type of data storage. Although the example IoT device data store 128 is shown as part of the IoT security service 110 in FIG. 1, in general, an IoT device data store 128 can be implemented by another service of a service provider network 100, another component of the service provider network 100, or using any other data storage mechanism. In other embodiments, the collected data can instead be processed in a streaming fashion and without persisting the data in long-term storage.

In an embodiment, storing the IoT device data 120 in the IoT device data store 128 can include normalizing the data so that the data can be stored using one or more standardized data formats. For example, because the IoT device data 120 can be collected from a number of disparate data sources, the received data can be represented using a variety of different formats (for example, various log data formats, network traffic data records, various data formats generated by device management/audit systems, and so forth). An IoT security service 110 may convert the data collected from these systems into a standard set of data fields, modify or supplement fields in the data (for example, to convert IP addresses into domain names, supplement the data with user account identifiers, and so forth), or perform any other operations on the data to facilitate subsequent analyses.

In an embodiment, at circle "3," the IoT security service 110 analyzes the IoT device data 120 collected from the IoT devices 104 and related systems to identify occurrences of defined security threat facilitators and security threat indicators, and uses the identified facilitators and indicators to calculate various security-related scores including, for example, a threat level score and a breach likelihood score. The analysis of the IoT device data 120 can be based in part on a defined IoT kill chain comprising a number of stages collectively identifying a model for security attacks against IoT devices. In an embodiment, each stage of IoT kill chain can be associated with a set of defined security threat facilitators, security threat indicators, or both, as described in more detail hereinafter. As indicated above, the collected IoT device data 120 can include both device profile data (for example, related to various characteristics of IoT devices 104) and device activity data (for example, related to various types of actions performed by IoT devices 104 or related components).

In an embodiment, a security threat facilitator refers generally to any configuration, setting, or other characteristic of an IoT device 104 that represents a potential security threat vector associated with the device or that may otherwise facilitate one or more stages of a security attack. In an embodiment, the exploitation of a facilitator is typically evidenced by one or more defined security threat indicators. For example, data indicating the presence of an open Telnet port on a IoT device may represent a defined facilitator, whereas data indicating that the Telnet port has been probed by an external device may represent a defined indicator. As another example, data indicating that an IoT device is configured to allow all outbound connections may represent a defined facilitator, whereas data indicating network traffic being sent on certain ports may represent a defined indicator. Examples of various types of defined facilitators and indicators for each stage of an example IoT kill chain are described below. In general, the defined facilitators and indicators described herein can be generic to any type of IoT device, or there may exist facilitators and indicators that are specific to particular types of IoT devices.

In an embodiment, a defined security threat facilitator or indicator is identified based on identifying one or more constituent "signals" in the collected IoT device data 120. A signal generally represents any type of defined device characteristic or action that can be used to establish the presence of one or more defined indicators or facilitators. For example, one indicator related to a reconnaissance stage of a kill chain can be defined by the detection a port probe and an occurrence of a port probe can be identified based on identifying the occurrence of a plurality of individual port requests. In this example, each of the individual port requests may correspond to a defined signal. Each of these signals may also indicate additional information about the port probe such as, for example, which ports were accessed, a total number of ports accessed, a time at which each of the ports was accessed, and so forth. In general, the more signals that are observed related to various facilitators and indicators can increase a confidence level with which the related facilitators and indicators are identified.

Figure 2:
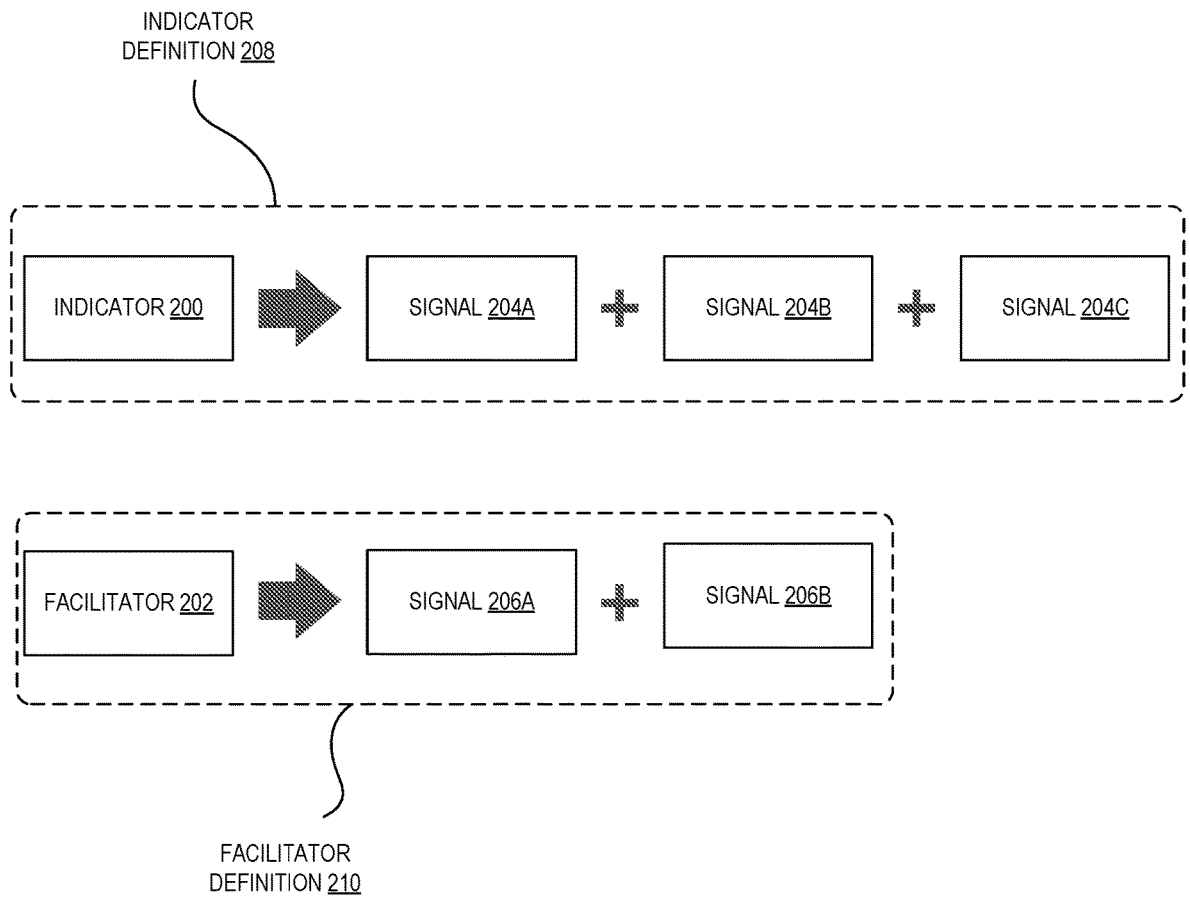
FIG. 2 is a diagram illustrating a relationship between IoT device signals, security threat indicators, and security threat facilitators according to some embodiments.

FIG. 2 is a diagram illustrating a relationship between IoT device signals, security threat indicators, and security threat facilitators. FIG. 2 shows, for example, a generic indicator definition 208 and a generic facilitator definition 210. As shown, an indicator 200 can be identified based on identification of a set of one or more signals (for example, signals 204A-204C), and a facilitator 202 can be identified based on identification of a set of one or more different signals (for example, signals 206A and 206B).

In an embodiment, an IoT security service 110 can include a default set of defined facilitators and indicators for each stage of a default IoT kill chain. In other embodiments, an IoT security service 110 can provide one or more interfaces that enable a user 112 to customize the definitions of the facilitators and indicators associated with each kill chain stage, or to add or remove facilitators and indicators that are associated with one or more of the stages of a defined IoT kill chain, to modify a kill chain itself, or combinations thereof.

As indicated above, an IoT security service 110 periodically or continuously analyzes incoming IoT device data 120 for the presence of defined signals and higher-level facilitators and indicators relative to each IoT device 104 monitored by the service. In an embodiment, the IoT security service 110 uses detected facilitators and indicators to calculate various types security-related scores related to the IoT devices including, for example, a security threat level score and a security breach likelihood score. In an embodiment, a security threat level score for a particular device is calculated generally by accumulating security threat facilitators identified for a device which indicate various security threat vectors associated with the device.

In an embodiment, the calculation of a threat level score can be further based on a severity level assigned to each facilitator (for example, indicating how likely each facilitator is to be abused), information about known ongoing security attack campaigns that involve one or more of the identified facilitators (thereby increasing the likelihood that the facilitator is exploited), among other possible factors. For example, if the IoT security service 110 identifies a facilitator in IoT device data 120 associated with an IoT device 104 indicating that the device has all ports open, a threat level score associated with the device may increase. If the IoT security service 110 identifies additional facilitators, the score can be further increased. If one or more of the identified facilitators is associated with a relatively high severity level because of known ongoing attacks involving the identified facilitator, the calculated threat level score can be even further increased, and so forth.

In an embodiment, a calculation of a breach likelihood score is based on a combination of identified indicators, recent threat level scores, and possibly other factors including historical observations related to a device. For example, the breach likelihood score for an IoT device may be increased if the IoT security service 110 identifies one or more indicators in IoT device data 120 related to the device, increased further if the device's threat level score increases, increased even further if the identified indicators relate to other identified facilitators associated with the same device, increased still further based on information about ongoing security attack campaigns involving the identified indicators, and so forth.

As indicated above, the calculation of a breach likelihood score can be based at least in part on analyzing historical trends of a device. For example, one defined indicator may be identified when a device attempts to establish connections to many other devices. In some cases, this activity might represent a compromised device scanning a network environment for other devices to infect but, in other cases, the device performs such scanning for legitimate purposes. Thus, a baseline of historical activity of a device can be accounted for when calculating the breach likelihood score. For example, if an indicator has been observed regularly for past 30 days, it may be weighted relatively low, whereas an indicator that suddenly starts occurring without any history can be weighted more heavily.

In an embodiment, the calculation of a threat level score, breach likelihood score, or both, can be based in part on a mapping of the identified facilitators and indicators to the defined stages of an associated kill chain. For example, a threat level value associated with a facilitator may be given a higher weighting if the facilitator is associated with the abuse stage compared to a facilitator associated with the reconnaissance stage (because facilitators that enable abuse to occur are typically more concerning than facilitators that enable reconnaissance actions to occur). As another example, an indicator that is associated with the reconnaissance stage may be given a lower weight when calculating a breach likelihood score than an indicator associated with the persistence or abuse stage of the kill chain.

In an embodiment, the calculation of a threat level score, breach likelihood score, or both, for a particular IoT device 104 can be based in part on data that relates to one or more other IoT devices 104 in the same customer network 102 or in one or more other networks. For example, while the detection of various facilitators and indicators may be not be triggered by data collected from individual IoT devices 104 alone, data collected from various combinations of IoT devices 104 associated with a customer may evidence the presence of various facilitators and indicators. This may be caused in part by the relatively low amount of activity associated with individual IoT devices 104 because of power considerations and other reasons. For example, a compromised IoT device 104 might start generating a small number of outbound network connections that do not rise to the level of a defined indicator, but a group of IoT devices 104 generating such outbound network connections in the aggregate may evidence a defined indicator of the abuse stage.

In an embodiment, an IoT security service 110 can identify facilitators and indicators in defined time windows, for example, in one minute, hourly, daily, or any other defined time windows. In this example, the calculation of a threat level score, breach likelihood score, or both, can be based on examining identified facilitators and indicators in a current time window and also facilitators and indicators in a lookback window of n time slots. In some embodiments, an order in which facilitators and indicators are identified can also be included in a calculation of one or both of the scores.

Figure 3:
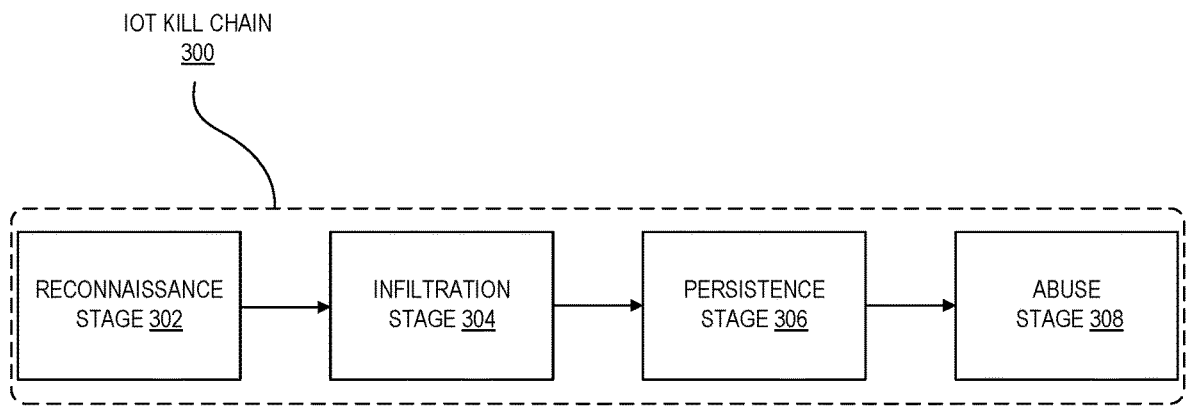
FIG. 3 is an example of a kill chain used to model security threats related to IoT devices according to some embodiments.

FIG. 3 is a diagram illustrating an example IoT kill chain used to model security attacks related to IoT devices. As shown in FIG. 3, an example IoT device kill chain 302 includes several stages including, for example, a reconnaissance stage 302, an infiltration stage 304, a persistence stage 306, and an abuse stage 308. In other embodiments, an IoT device kill chain 302 can include more or fewer stages and can include different stages than those shown in FIG. 3, which may be customizable by a user of the IoT security service 110.

In an embodiment, a reconnaissance stage 302 relates to actions taken by attackers to identify target IoT devices or to gather additional information about known target IoT devices. The reconnaissance stage 302 can include at least two types of reconnaissance: (a) direct reconnaissance, in which IoT devices are probed to identify devices of interest, and (b) indirect reconnaissance, in which information about IoT devices is obtained from secondary systems (for example, IoT backend services or other applications that monitor the IoT devices) or from individuals (for example, IoT device administrators or users of the devices). Additionally, an attacker can take these actions in either (a) a targeted manner, where specific IoT devices are targeted, or (b) in a non-targeted manner, where arbitrarily selected devices or group of devices are targeted.

Non-targeted, direct reconnaissance typically involves an attacker performing mass scans on a large range of network addresses, where the network addresses can be either randomly or sequentially scanned to identify potential target devices matching the attacker's capabilities (for example, devices matching the attacker's toolchain to be used in subsequent stages of attack). IoT-specific non-targeted attack campaigns often focus the reconnaissance on identifying IoT devices which are likely to be devices with common weaknesses (for example, running a Telnet service with a default or weak password) and having known vulnerabilities (for example, an unpatched firmware version). This reconnaissance typically does not attempt to identify all open ports on a device, for example, but instead verifies openness of ports for common services (for example, Telnet) on IoT devices.

An attacker performing targeted, direct reconnaissance may perform more sophisticated and aggressive probes (for example, by attempting to identify any open ports and corresponding services daemons, identify firmware or operating system versions, and so forth). Hence, this reconnaissance typically generates a greater number of signals compared to non-targeted reconnaissance unless a sophisticated attacker employs a slow-paced probing strategy to spread out the signals. In contrast, targeted reconnaissance typically has fewer global signals, which reduces the chance of detection by globally deployed and monitored threat intelligence gathering systems (for example, detection using honeypots).

Non-targeted and targeted indirect reconnaissance can involve using sources of information outside of target IoT devices. This information can be collected by actively (for example, by direct engagement with the sources) or passively (without active engagement with the sources) probing secondary systems and individuals. For example, an attacker may actively infiltrate hosts running reporting systems of an established IoT botnet where there exists information on compromised IoT devices. Alternatively, an attacker can passively monitor the network traffic transportation channels between IoT device vendors' monitoring systems and their manufactured devices to gather the same. In another example, an attacker can use social engineering or extortion to extract similar information from IoT device administrators. Thus, indirect reconnaissance often generates no signals or generates minimal local signals on target IoT devices due to absence of any direct interactions with them.

While reconnaissance of IoT devices is often performed at an initial stage of an IoT attack campaign, secondary reconnaissance may continue throughout the remaining stages (for example, during the infiltration stage 304, persistence stage 306, and abuse stage 308). For example, during the infiltration stage 304, reconnaissance may be refocused on identifying detection by security monitoring systems. Also, launching reconnaissance after infiltration into an IoT device may reveal otherwise inaccessible devices (for example, where access is restricted from IoT devices with connection to the local subnet). In another example, during the persistence stage 306, IoT malware can focus its reconnaissance on identifying other competing attack campaign assets on target IoT devices. Similarly, in the abuse stage 308, compromised IoT devices can be used to scale and repeat initial stage reconnaissance.

IoT attack campaigns which are directed at specific types or brands of IoT devices (for example, particular types of DVRs, internet routers, and so forth) without publicly-known weaknesses may also perform offline reconnaissance to obtain (for example, purchase or steal) an instance of target IoT devices and examine the target IoT devices for specific vulnerabilities (for example, using remote administrative dashboards or other device interfaces) and corresponding weakness (for example, the use of default passwords).

The following table lists example facilitators and indicators related to the reconnaissance stage 302, and further lists example signals used to identify each of the listed facilitators and indicators:

| ID | Reconnaissance Facilitators and Signals |
|---|---|
| RF101 | Public open ports, especially related to common networks services (for example, Telnet, SSH, FTP) and which are bound to their default port numbers (for example, Telnet on port 23 or 2323, SSH on port 21, FTP on port 22), and verbose banners which disclose details about service daemons and their platform.<br>Signal 1: Active scanning of open ports and services.<br>Signal 2: Passive monitoring of IoT device network traffic.<br>Signal 3: Internal (on-device) audit of open network ports.<br>Signal 4: Audit of device network configurations in IoT backend services.<br>Signal 5: Audit of information disclosed by public threat intelligence feeds. |
| RF102 | Unencrypted and poorly encrypted communication channels disclosing information (for example, on-wire or air) about IoT device configurations, network services, and their network dependencies. On IoT devices, these can be communication channels commonly used for purposes such as health checks, heartbeats, remote commands, data and code syncs, and pushing updates.<br>Signal 1: Passive monitoring of IoT device network traffic.<br>Signal 2: Internal (on-device) audit of active networking processes.<br>Signal 3: Audit of device network channels configuration in IoT backend services. |
| RF103 | Compromised secondary systems (for example, IoT backend services) revealing detailed information about IoT devices configuration and capabilities.<br>Signal 1: Passive monitoring of IoT device network dependencies.<br>Signal 2: Audit of security status of IoT device network dependencies. |
| RF104 | Publicly accessible detailed information about IoT device internals. For example, IoT device firmware may contain its source code and documentation or the same or similar information can be obtained from IoT device's mobile application or manufacturer's website.<br>Signal 1: Internal (on-device) or external audit of IoT device digital content.<br>Signal 2: Audit of threat intelligence feeds about IoT device's publicly accessible information. |

| ID | Reconnaissance Indicators and Signals |
|---|---|
| RI101 | Inbound port probe. In the context of IoT attack campaigns, port scans might be limited to scanning a single port (especially in nontargeted direct reconnaissance). Hence, port scans of IoT devices in its most generic form referred to as port probing, surfaces as unexpected inbound network connections or packets received on one or more ports.<br>The following signals and their historical baseline can be used to identify unexpected or anomalous inbound connections and packets received:<br>Signal 1: Ports accessed.<br>Signal 2: Protocols used on each port.<br>Signal 3: Times of network activity on each port.<br>Signal 4: Volume of network inbound/outbound traffic on each port.<br>Signal 5: Size of sent and received packets.<br>Signal 6: Number of inbound connections.<br>Signal 7: Relations to geo-locations on each port.<br>Signal 8: Relations to ISPs on each port.<br>Signal 9: Relations to local network addresses on each port.<br>Signal 10: Relations to network address in threat intelligence blacklists on each port.<br>In aggressive port probing (for example, port scanning), tracking distinct ports accessed could be sufficient; however, even in this case tracking the remaining signals could help to distinguish between legitimate and illegitimate probes.<br>The quality and precision of these signals can be increased by adding two dimensions of access outcome (for example, accepted or rejected connections to each port) and threat intelligence matching (for example, port connections from known malicious or compromised network addresses) to applicable signals above. |
| RI102 | Outbound port probe. This indicator can be identified during either the persistence or abuse stage of an IoT device attack campaign. During the persistence stage, an adversary could take advantage of its access to a compromised IoT device to spread itself to other devices which otherwise would be unreachable (that is, not publicly exposed on internet). Hence, the adversary attempts to identify those victim devices using port probes, infiltrate them and persist itself in the compromised IoT device network. In abuse stage, this port probing can be used as a reconnaissance for hire to help with others' attack campaigns, or to scale the original attack campaign's reconnaissance where the port probing is distributed across compromised IoT devices. Outbound port probes from IoT devices are generally identified based on unexpected outbound network connections or packets sent to one or more ports of multiple |

-continued

| | |
|---|---|
| | unexpected network destinations. Hence, higher weights can be assigned to both qualitative and quantitative "network destination relations" signals (that is, distinct relations and their total count within an aggregation time window). Additionally, the strength of these signals can be increased by adding a dimension of port access outcome (for example, accepted or rejected connections) and process identifiers (for example, name, signature, process identifier (PID), binary image path) to applicable signals.<br>Beyond the local signals generated on IoT device and its network, outbound port probes can cause global signals generated by external security monitoring systems (for example, due to random hits on threat intelligence gathering honeypots). Hence, presence of an IoT device identifier (for example, a public network address) in threat intelligence blacklists is a signal of interest.<br>The following signals and their historical baseline can be used to identify unexpected or anomalous inbound connections and packets received:<br>Signal 1: Ports accessed.<br>Signal 2: Protocols used.<br>Signal 3: Times of network activity.<br>Signal 4: Volume of network inbound/outbound traffic.<br>Signal 5: Size of sent and received packets.<br>Signal 6: Number of inbound connections.<br>Signal 7: Relations to geo-locations.<br>Signal 8: Relations to ISPs.<br>Signal 9: Relations to remote network addresses.<br>Signal 10: Relations to local network addresses.<br>Signal 11: Presence of device's network address in threat intelligence blacklists.<br>Signal 12: Attempts to connect or send packets to reserved IP addresses. |
| RI103 | System processes and files probe. IoT device attack campaigns strive to position themselves on a breached IoT device as the only adversary due to computing resource constraints on these devices, as well as conflicts of interest and modes of operations. Hence, after successful infiltration and early in persistence stage, some attack campaigns probe for processes and files belonging to other known IoT malware and botnets with the purpose of eliminating them.<br>Signal 1: Process searches with names known to be IoT attack campaign assets.<br>Signal 2: File searches with names known to be IoT attack campaign assets.<br>Signal 3: Process searches from unexpected contexts (for example, process trees).<br>Signal 4: File searches from unexpected contexts (for example, process trees).<br>These signals can be gathered by an IoT on-device agent monitoring system calls and common commands on IoT device platform used for gathering these signals. To minimize the size of IoT malwares binaries, adversaries often reuse available executables on target IoT devices to accomplish their goals. Hence, even only monitoring process launches, their command line argument and context (for example, parent processes and process tree) can effectively collect these signals. However, tapping into system audit logs could cover cases where the process and file search is coded into IoT malwares binaries. |

In an embodiment, the infiltration stage 304 focuses on breaching IoT devices (for example, establishing a digital presence on the devices) using target devices and entry points identified during the reconnaissance stage 302. For example, a non-targeted, direct reconnaissance may identify a list of IoT devices with the Telnet service running on port 2323. As one example, the infiltration stage 304 may involve ingesting the list of identified IoT devices and any associated metadata (for example, a type and brand of IoT device) and launching a dictionary attack against the Telnet service. The passwords used in a dictionary attack can include common default passwords among IoT devices if device types are unknown; otherwise, a dictionary attacked can be tailored to one or more specific types of IoT devices.

Similar to the reconnaissance stage 302, an adversary may use two or more different infiltration paths for breaching an IoT device including (a) a direct path, where entry points on the IoT device are used (for example, on-device Telnet or SSH service ports), and (b) an indirect path, where there is no direct engagement with entry points on the device (for example, by instead creating a malicious payload that is injected into an IoT firmware repository and ultimately pushed to managed IoT devices by a legitimate IoT device management system). Both direct and indirect infiltration can operate based on information gathered by non-targeted or targeted reconnaissance to launch non-targeted or targeted infiltration.

A non-targeted infiltration operation, which obtains its target list using non-targeted reconnaissance, often aims for fast gain (for example, by using a dictionary attack with a list of fifty passwords) and typically does not expend significant effort attempting to breach any one particular IoT device. Hence, a non-targeted infiltration operation typically results in few local signals, but exhibits a high level of global signals due to short engagement with many IoT devices. In contrast, targeted infiltration, which obtains its target list from a targeted reconnaissance, is more likely to spend more cycles on a single target and thereby generate a greater number of local signals. For example, infiltration using an open Telnet port could use a larger password dictionary or a more aggressive brute-force method. Additionally, a targeted infiltration might use information gained from indirect paths (for example, social engineering or extortion to obtain Telnet passwords).

Targeted IoT attack campaigns can employ physical infiltration methods to circumvent digital and remote access blockers. For example, an adversary might replace removable storage of an IoT device with their own containing a malicious payload. As another example, the adversary may use debug ports on an IoT device to tamper with its security controls and systems configurations.

Infiltration is often the most time and resource consuming stage in an IoT attack campaign. Hence, common IoT attacks (non-targeted) often fine-tune their infiltration methods for only IoT devices (for example, Telnet password brute-forcing with only known default passwords for IoT devices) even though many of their techniques could be leveraged on other device types (for example, web application hosts, end-user desktop machines, and so forth) as well. This is to maximize their gain as infiltration of IoT devices usually results in longer term persistence and abuse (for example, IoT devices typically are not maintained and monitored well and not patched frequently, if at all, in comparison to other network-connected device types).

The following table lists infiltration facilitators and indicators along with the respective signals to use for their identification:

| ID | Infiltration Facilitators and Signals |
|---|---|
| IF101 | Publicly reachable network services with weak authentication mechanisms.<br>Signal 1: Active authentication bypass attempt on network services (for example, using dictionary attacks).<br>Signal 2: Internal (on-device) audit of network service configurations.<br>Signal 3: Audit of device network service configurations in IoT backend services.<br>These network services include standard services such as Telnet, SSH, uPnP as well as specific IoT device type administration interfaces. These services might not necessarily be reachable from anywhere on the public internet but access restricted to networks practically public (for example, cloud computing provider networks). |
| IF102 | Publicly reachable network services with known vulnerabilities.<br>Signal 1: Active infiltration through network services by exploiting known vulnerabilities.<br>Signal 2: Passive internal (on-device) audit of network service versions and patch status.<br>Signal 3: Audit of device network service configurations in IoT backend services. |
| IF103 | Shared credentials provisioned on a group of IoT devices for accessing IoT backend services (for example, devices built by the same manufacturer or managed by the same IoT device operator). Hence, an adversary obtaining access to one of these IoT devices (for example, a purchased or stolen device) may horizontally escalate their privileges (for example, by changing other devices data or code syncs in IoT backend systems).<br>Signal 1: Passive monitoring of network traffic on multiple IoT devices in the same device group.<br>Signal 2: Internal (on-device) audit of multiple devices from a group of IoT devices.<br>Signal 3: Audit of IoT backend services managing a group of IoT devices. |
| IF104 | Over-privileged credentials provisioned on IoT devices used to access IoT backend services. Hence, an adversary with access to one of these devices (for example, a purchased or stolen device) may vertically or horizontally escalate their privileges (for example, by changing other devices data or code syncs in IoT backend systems).<br>Signal 1: Active enumeration of privileges granted to provisioned credentials.<br>Signal 2: Audit of credentials privileges in the corresponding IoT backend services. |
| IF105 | Communication channels lacking cryptographically strong data integrity controls thus allowing data tampering in transit. On IoT devices these can be communication channels commonly used for purposes such as health checks, heartbeats, remote commands, data and code syncs, and pushing updates.<br>Signal 1: Passive monitoring of IoT device network traffic.<br>Signal 2: Internal (on-device) audit of active networking processes.<br>Signal 3: Audit of device network channels configurations in IoT backend services. |
| IF106 | IoT backend services contain vulnerabilities or misconfigurations allowing unauthorized actors to access and control managed IoT devices.<br>Signal 1: Audit of IoT backend services for known vulnerabilities.<br>Signal 2: Audit of IoT backend services for their device enrollment misconfigurations or weaknesses (for example, any arbitrary device with a X509 certificate signed by a public certificate authority may enroll in the pool of managed devices and broadcast messages to other IoT devices or receive messages from the IoT backend services). |
| IF107 | Poor physical security. For example, IoT device is missing tamper resistance features to stop an adversary from accessing or replacing the device's storage media. In another example, IoT device might have external ports (for example, USB) providing administration interfaces to reset the device to an insecure state.<br>Signal 1: Audit of device physical security features registered in IoT backend services.<br>Signal 2: Audit of device physical security features in catalogues of known IoT devices features. |

| ID | Infiltration Indicators and Signals |
|---|---|
| II101 | Username and password brute-forcing or dictionary attack on publicly reachable network services of IoT devices. For IoT devices which are accessible on the public internet, this indicator has a baseline of signals including continuous mass scans performed by white-hat scanners or active non-targeted IoT attack campaigns. However, the deviations from the baseline and sequence of failed and passed authentication attempts on these IoT devices may reveal a targeted infiltration attempt and/or successful infiltration in general.<br>The following signals and their historical baseline can be used to identify these indicators:<br>Signal 1: Failed and passed authentication attempts on each network service.<br>Signal 2: Username and passwords used for authentication to each network service.<br>Signal 3: Cryptographic materials used for authentication to each network service.<br>Signal 4: Network traffic patterns on the device (See RI101 and RI102). |
| II102 | Exploiting known or 0-day vulnerabilities on publicly reachable network services of IoT devices. Process launch and file access pattern (for example, historical time of occurrence, distinct process and file names, their total number broken into time |

-continued

| | |
|---|---|
| | windows) and contexts (for example, command line arguments, parent process or process tree) could reveal exploits reusing common executable tools or file tampering for accomplishing the infiltration. Monitoring and identifying anomalies in these process launches and file accesses can be used particularly on exposed network service daemons (for example, Telnet, SSH) and system processes with network connections (for example, firmware update check process) on IoT devices.<br>The following signals and their historical baseline can be used to identify this indicator:<br>Signal 1: Process launches and crashes and associated contexts.<br>Signal 2: Process crashes and associated contexts.<br>Signal 3: Files or directories accessed and associated contexts.<br>Signal 4: Processes and system memory and CPU usage.<br>Signal 5: System reboots and crashes.<br>Signal 6: Known malicious payloads in IoT device network traffic.<br>Signal 7: Network traffic patterns on the device (See RI101 and RI102). |
| II103 | Indirect infiltration through IoT backend services or network communication channels (for example, using shared or over-privileged credentials provisioned on IoT devices, firmware update channel lacking cryptographic data integrity controls, vulnerabilities in IoT backend services, and so forth).<br>Signal 1: Anomalous activities in IoT backend services.<br>Signal 2: Commands (size, type, parameters, frequency) received from IoT backend services.<br>Signal 3: Software and firmware changes on the IoT device (for example, firmware downgrades, known malicious binaries copied, security controls weakened or disabled).<br>Signal 4: Network traffic patterns on the device (See RI101 and RI102). |

In an embodiment, a persistence stage 306 generally involves securing a lasting digital presence on a device and establishing a resilient and stealthy command and control channel. In some examples, securing a lasting digital presence on the device is achieved by deploying a binary payload to the device that restarts after a reboot or sudden crashes. This technique can be used particularly if an attacker is aware that a breached device has known restart cycles or IoT malware has known bugs causing frequent crashes. In absence of these concerns, an attacker might instead prefer to maintain stealth and avoid an easy way to find a footprint of the attack on the device's storage media. For example, an IoT malware might execute its processes in memory and subsequently delete any evidence of the processes on disk.

In some examples, an IoT attack campaign also attempts to secure its persistence against active threats such as IoT device security systems (for example, by killing device re-provisioning mechanisms to avoid disinfection) and competing attack campaigns (for example, by eliminating the original and any other known infiltration paths on the device). To persist and expand access beyond IoT device re-provisioning and original infiltration path patching, the persistence stage 306 might involve escalating on-device privilege paths (for example, by searching for credentials used to access IoT backend services) or off-device paths using lateral movement (for example, by making hops to other reachable devices).

The persistence stage 306 can also involve an attacker establishing a resilient and stealthy command and control channel. The establishment of a command and control channel enables attackers to benefit from controlling the breached devices (for example, in order to launch DDoS attacks for hire, exfiltrate sensitive data captured or sensed by IoT devices, and so forth). As an IoT attack campaign and its pool of breached IoT devices grows (for example, to create an IoT botnet), its operation eventually shows on the radar of global threat intelligence systems (for example, honeypot IoT devices). With further analysis of building blocks of an IoT botnet (for example, a communication mechanism with reporting servers and command and control hosts), security organizations attempt to dismantle them.

As described elsewhere herein, disinfecting breached IoT devices poses many challenges, for example, because of a lack of standardized IoT device ownership tracing protocols. Thus, security organizations often focus on breaking or taking control of their reporting and control channels. Hence, IoT attack campaigns strive to defend their communication channels by (a) using dynamic channel selection (for example, using domain names instead of using fixed IP addresses, domain name hopping, using domain generation algorithms, and so forth), (b) applying strong authentication and message confidentiality and integrity controls (for example, by using cryptographic algorithms), (c) tunneling through trusted channels (for example, tunneling through social media websites, cloud computing hosts, and so forth), and (d) using decentralized channels (for example, by using peer to peer networking protocols).

Depending on the scenarios planned for the abuse stage 308, an IoT attack campaign adjusts the depth and breadth of techniques used for securing a digital presence on the device, further adjusts the resiliency and stealth level of their communication channels. For example, if an attacker's plan is an immediate malicious action against the IoT device itself (for example, to brick the device or keep the device hostage to collect a ransom), then a highly resilient and stealthy communication channel typically is not desired. In contrast, if the abuse is planned for a time far in the future, the attackers might create communication channels with minimal unnecessary noise (for example, by avoiding frequent beaconing messages from command and control hosts or frequent heartbeat messages sent to IoT botnet report servers).

The following table list facilitators and indicators related to the persistence stage 306, and further lists example signals used to identify each of the listed facilitators and indicators:

| ID | Persistence Facilitators and Signals |
|---|---|
| PF101 | Weak self-defense mechanisms for on-device breach detection and disinfection systems.<br>Signal 1: Audit of IoT backend services where these self-defense mechanisms can be configured for their managed IoT devices.<br>Otherwise, a manual audit can be used to collect this signal. |
| PF102 | Shared and/or privileged credentials provisioned on IoT devices. See IF103 and IF104 for signals of this indicator. |

| ID | Persistence Indicators and Signals |
|---|---|
| PI101 | Malware payload drop. To secure a long lasting digital presence, an adversary deploys and executes binary files (and associated nonbinary configuration and resource files) on the breached IoT device. Because IoT devices have many different processor architectures, IoT attack campaigns maintain a repository of their malicious payload compiled for various target platforms. In the persistence stage 306, the campaigns can identify a breached device's architecture to choose compatible payload binaries and to deploy the selected binaries on the device. This is commonly achieved using either probing of existing binaries on the device or alternatively attempting to launch binaries for every supported architecture until one succeeds.<br>Signal 1: Files created on disk have name or signatures identifying IoT attack campaign assets.<br>Signal 2: Files created on disk which contain payload (for example, including hardcoded IP addresses, domain names, a known adversary's name or email address, and so forth) identifying IoT attack campaign assets.<br>Signal 3: Files loaded in memory which contain payload (for example, including hardcoded IP addresses, domain names, a known adversary's name or email address, and so forth) identifying IoT attack campaign assets.<br>Signal 4: Processes running (loaded in-memory) missing binary images on disk.<br>Signal 5: Tools used for downloading or creating files and their context (for example, echo used from Telnet daemon).<br>Signal 6: Attempts to execute binaries incompatible with the device architecture |
| PI102 | Escalation of privileges. The initial infiltration path may be disabled (for example, patching security vulnerabilities or disabling network services) and an IoT device may be disinfected (for example, due to re-provisioning), hence to repeat or expand infiltration, the adversary may look into identifying alternative paths with the information available on the breached device. For example, after successful infiltration using a dictionary attack on Telnet, the adversary may search the IoT device for credentials (for example, access keys to IoT backend services, SSH private keys for accessing data sync servers). Beyond on-device assets that may facilitate an escalation of privilege, an adversary may use its position on the device (for example, IoT device's local subnet) to make a lateral movement to other reachable devices.<br>Signal 1: Attempts to access files known to contain access credentials.<br>Signal 2: Attempts to access files known to contain cryptographic materials.<br>Signal 3: Anomalous network connections from an IoT device to neighboring IoT devices.<br>Signal 4: Anomalous network connections from an IoT device to backend services. For a breakdown of more specific signals to detect anomalous network connection, see RI101 and RI102. To specifically detect an escalation of privileges and lateral movement, among all network connection features, a higher weight can be given to unexpected device-to-device relations (for example, IoT device X had never connected to IoT device Y at time Z), unexpected device-to-cloud relations (for example, IoT device X had never used credentials Y to connect to backend service Z at time W) and unexpected off IoT devices-to-cloud relations (for example, credential X, provisioned to device Y with IP address Z is being used from IP address K to connect to backend service G).<br>Beyond qualitative abnormality detection on these signals, the detection mechanism can also benefit from their quantitative analysis (for example, IoT device X commonly connects to an average of 5 other IoT devices in each 10 minutes aggregation time window, and the system has observed unexpected distinct connections to 30 devices in the last ten minutes). |
| PI103 | Eliminating competing IoT attack campaign assets. Due to computing resource constraints on the infiltrated IoT device as well as conflicts of interest (for example, different motivations driving each IoT attack campaign) and modes of operations (for example, a time bomb IoT ransomware, IoT botnet for DDoS attacks), an adversary may attempt to eliminate digital presence of any other competing IoT malware on the device (for example, kill their processes, delete their binary payloads, and dismantle their command and control channels).<br>The following signals can be used to identify this indicator:<br>Signal 1: Attempts to delete files known to be IoT attack campaigns assets.<br>Signal 2: Attempts to update files known to be IoT attack campaigns assets.<br>Signal 3: Attempts to kill processes known to be IoT attack campaigns assets.<br>In situations where capturing these signals without having a real infected IoT device is not possible, a high confidence detective control can be built using honeypot processes and files (for example, by launching processes and creating files with names known to be associated with IoT attack campaigns). |
| PI104 | Disabling breach detection and disinfection systems. If IoT device owners become aware of a compromised device (for example, based on signals gathered from security systems running on the device), the owners typically attempt to disinfect the device (for example, by re-provisioning the device with an updated firmware) to stop or |

|       | -continued |
|-------|------------|
|       | prevent any abuse scenarios. The disinfection process can often be triggered remotely using network services on the device (and in some case that is the one and only way in absence of any physical mechanism). Hence, persistence stage of an IoT attack campaign makes an attempt to disable the local security systems and eliminate the possibility of remote disinfections.<br>The following signals can be used to identify this indicator:<br>Signal 1: Attempts to kill processes known to be administration utilities.<br>Signal 2: Attempts to delete administration utilities binaries.<br>Signal 3: Attempts to disable administration utilities binaries (for example, configuration updates).<br>Signal 4: Missing heartbeats periodically received from on-device signal collection agents.<br>Signal 5: Attempts to disable security monitoring in IoT backend services.<br>Similar to PI102, a high confidence detective control can be built using honeypot processes and files (for example, by launching processes and creating files with known names for IoT device administration utilities or on-device signal collection agents). |
| PI105 | Eliminating the original and any other known infiltration paths on the device. For example, disabling exposed network services with vulnerabilities or weak authentication mechanisms.<br>The following signals can be used to identify this indicator:<br>Signal 1: Attempts to kill or disable network services (especially ones with known vulnerable versions).<br>Signal 2: Attempts to change system configurations to make network services unreachable.<br>Signal 3: Attempts to change system configurations to make network services reachable using access credentials or cryptographic materials with known association with IoT attack campaigns.<br>Signal 4: Attempts to change system configurations to make network services reachable from network locations known to be associated with IoT attack campaigns (for example, network locations blacklisted in threat intelligence feeds). |
| PI106 | Binding backdoor processes to network ports. To establish a synchronous command and control channel (for example, where the breached IoT device has a public network address), an adversary may bind their backdoor to a port used by a running service (for example, by killing Telnet daemon already bound to port 23 and replacing it with their own backdoor process) or an unused port number (for example, ports with no network service bound). It often happens that IoT attack campaigns use a common service port but with their own custom protocol (for example, binding a backdoor process to port 23 but not using the Telnet protocol). Hence, an audit process attempting to connect to these ports using the expected protocol can identify the irregularity. However, because this could be a legitimate service deployment with a peculiar configuration, running such audits regularly and maintaining the historical outcome helps to reduce likelihood of false positives.<br>The following signals can be used to identify this indicator:<br>Signal 1: Network protocols supported on open ports.<br>Signal 2: Open ports and bound services (for example, path to binary images and their signatures).<br>Signal 3: Process context of running network services (for example, parent process or process tree, command line arguments).<br>Signal 4: Network traffic on open ports contains payload uniquely identifying. |
| PI107 | Beaconing to receive instructions from command and control systems. To establish an asynchronous command and control channel (for example, where the breached IoT device does not have a public network address), IoT attack campaign launches a process on the device that regularly (for example, fixed or random intervals) polls their command and control servers for next instructions.<br>The following signals can be used to identify this indicator:<br>Signal 1: Domain name server look-ups (failures and successes).<br>Signal 2: Network traffic contains payload uniquely identifying known IoT attack beacons.<br>Signal 3: Network connections to known command and control servers.<br>Signal 4: Network connections to unexpected destination types (for example, paste websites).<br>Signal 5: Network traffic patterns on outbound connections (See RI101 and RI102). |

In an embodiment, an abuse stage 308 relates to activities used by attackers to exploit one or more breached devices. Depending on various possible motivations behind an IoT attack campaign, attackers may abuse the breached devices (for example, an IoT botnet) for purposes such as, for example, launching distributed denial of service attacks, participating in a distributed anonymization network, sending unwanted messages (for example, spam emails, spam social media messages or actions), mining cryptocurrencies, exfiltrating data captured or accessible to breached devices (for example, unauthorized surveillance using breached cameras), causing denial of service on breached devices' own functionality, and escalating physical access privileges to support nondigital criminal activities (for example, tampering with IoT devices controlling a bank's physical security system).

DDoS attack campaigns are a common abuse of breached IoT devices. Unlike non-IoT device backed DDoS attacks, attack campaigns abusing IoT devices might not attempt to hide their source IP address in favor of being able to exploit application layer attacks. Revealing the source IP address is not worrisome for IoT attack campaigns because of weak ownership and the difficulty with disinfecting many types of breached IoT devices. However, source IP address spoofing can still be a useful mechanism for implementing indirect volumetric DDoS attacks (for example, DNS amplification).

Furthermore, IoT devices commonly lack a default mechanism to prevent outgoing network traffic with spoofed source IP addresses. This places IoT devices in a better position for abuse compared to other device types (for example, desktop computers or hosts in a cloud computing platform) where typically a default mechanism at the operating system or network interface layer prevents source IP address spoofing.

The following table lists example indicators related to the abuse stage 308, and further lists example signals used to identify each of the listed indicators:

| ID | Abuse Indicators and Signals |
|---|---|
| AI101 | Bricking the IoT device (that is, a permanent DoS attack against the device itself). This may be the ultimate goal of an IoT attack campaign (for example, for reasons related to hacktivism, vigilantism, or cyber-terrorism) or as a cover-up of the main abuse activities (for example, erasing forensics evidence to complicate post-incident analysis of a data exfiltration from devices).<br>Signal 1: Commands attempting to corrupt device's storage.<br>Signal 2: Commands attempting to disrupt device's network connectivity.<br>Signal 3: Commands attempting to degrade the device's performance.<br>Signal 4: Missing heartbeats from on-device security monitoring agents.<br>Signal 5: Network connections with command and control servers. |
| AI102 | Mining cryptocurrencies; while mining high profile cryptocurrencies cannot be profitable on resource constrained IoT devices, there are alternatives which are less demanding on processing power. Commonly miners need to share their computing resources in mining pools and the connections well-known pools can reveal a mining activity. Hence, an IoT attack campaign often attempt to avoid direct connections and proxy their communications through encrypted tunnels or more trusted channels.<br>Signal 1: Processes and system memory and CPU usage.<br>Signal 2: Files created on disk have name or signatures identifying cryptocurrency mining utilities.<br>Signal 3: Files created on disk which contain payload identifying cryptocurrency mining utilities.<br>Signal 4: Files loaded in memory which contain payload identifying cryptocurrency mining utilities.<br>Signal 5: Network connections to cryptocurrency mining pools.<br>Signal 6: Network connections to anonymization networks and proxies.<br>Signal 7: Network connections with command and control servers. |
| AI103 | Distributed denial of service attacks. This is the most common form of IoT device abuse especially in the context of DDoS for hire attacks. The denial of service attacks supported on breached IoT devices is a mix of common volume based attacks (for example, UDP flood, NTP or DNS amplification), protocol attacks (for example, SYN flood) or application layer attacks (for example, Slowloris, HTTP Get or Post flood, XML bomb, Zip bomb). To maximize their impact, IoT DDoS attack campaigns launch a mixture of these attacks either at the same time or frequently switch among them.<br>The following signals can be used to identify this indicator:<br>Signal 1: Processes and system memory and CPU usage.<br>Signal 2: Network packets contain spoofed source IP addresses.<br>Signal 3: Network packets containing payload known to cause denial of service.<br>Signal 4: Network connections with command and control servers.<br>Signal 5: Network traffic patterns on the device (See RI101 and RI102). |
| AI104 | Exfiltrating data captured or accessible to breached devices.<br>The following signals can be used to identify this indicator:<br>Signal 1: Device function commands (for example, name, type, time) and the issuer processes and contexts.<br>Signal 2: Processes (and their context) accessing device captured data.<br>Signal 3: Network traffic with device captured data as payload sent to unexpected destinations.<br>Signal 4: Network connections with command and control servers.<br>Signal 5: Network traffic patterns on the device (See RI101 and RI102). |
| AI105 | Tampering with IoT device functionality.<br>The following signals can be used to identify this indicator:<br>Signal 1: Device function health-check reports.<br>Signal 2: Device function commands (for example, name, type, time) and the issuer processes and contexts.<br>Signal 3: Network connections with command and control servers.<br>Signal 4: Network traffic patterns on the device (See RI101 and RI102). |

In an embodiment, at circles "4A," "4B," and "4C" in FIG. 1, the IoT security service 110 performs various operations based on the analysis of the IoT device data at circle "3" including for example, generating various graphical user interface(s), generating audit or security alerts, generating automated commands to remediate detected security threats or breaches, and so forth. At circle "4A," for example, the IoT security service 110 can further provide various types of security data to a user 112 based on the analyses performed by the service. In one embodiment, the security data provided to a user 112 can include information indicating a calculated threat level score, breach likelihood score, identified facilitators and indicators, or any combinations thereof. The provided security data can be used, for example, to generate one or more graphical user interface (GUIs) that display information related to a user's monitored IoT devices 104. A user 112 can use the GUIs to view a security posture of the user's devices, including viewing threat level scores and breach likelihood scores for particular devices or groups of devices, viewing and responding to security alerts, viewing more details information related to the calculation of threat level and breach likelihood scores, and so forth. A user 112 can use such interfaces to prioritize their security investigations based on threat level and breach likelihood scores associated with their devices. As another example, if a user notices that a same security threat that has suddenly been identified for a number of different devices, that might indicate that a new patch opened up a new facilitator on several IoT devices 104. As another example, the security data provided to a user 112 can include the generation of various types of alerts (email alerts, event notifications, and the like) in response to a calculated threat level score or breach likelihood score exceeding a defined threshold (which can be a default threshold or a user-defined threshold).

Figure 4:
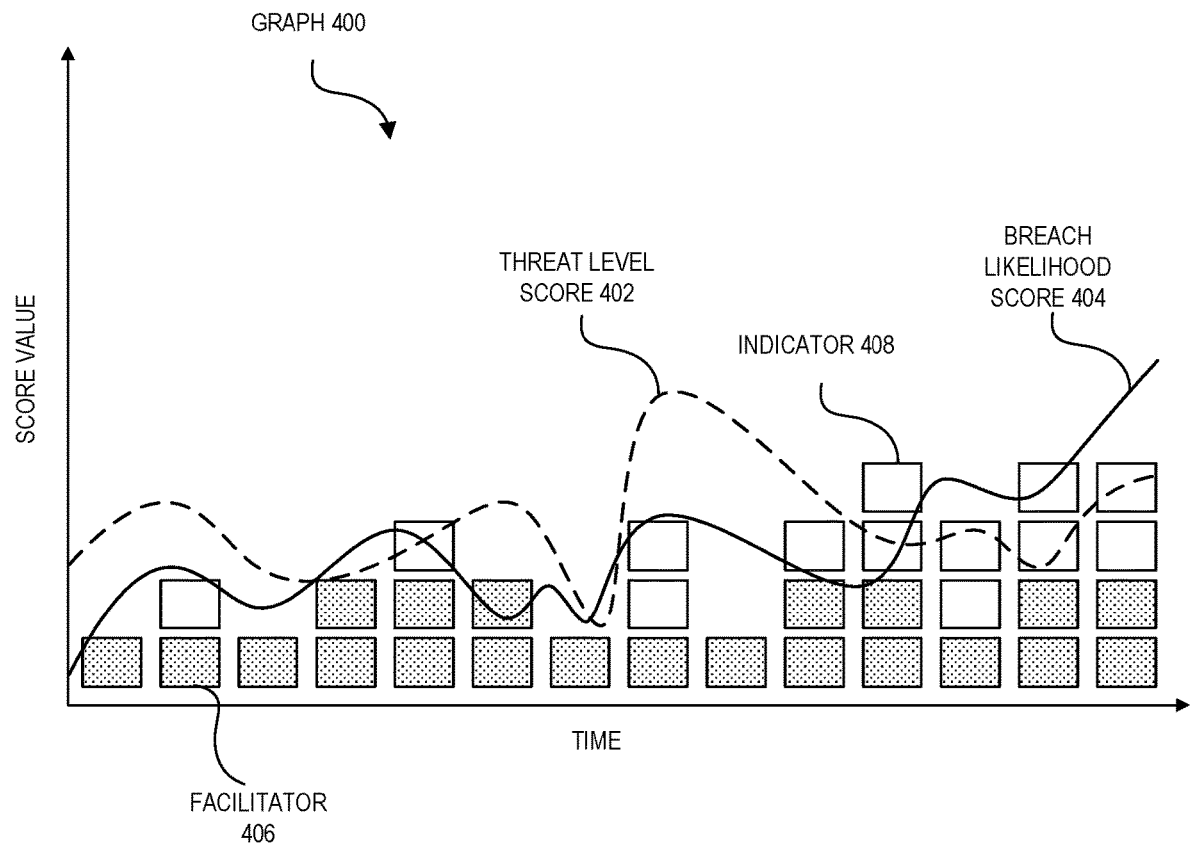
FIG. 4 is a graph illustrating a relationship between identified security threat facilitators and indicators related to one or more IoT devices and a calculated threat likelihood score and breach likelihood score according to some embodiments.

FIG. 4 is a graph illustrating a relationship between identified security threat facilitators and indicators related to one or more IoT devices and calculated threat likelihood scores and breach likelihood scores according to some embodiments. A graph similar to graph 400 may be displayed, for example, as part of one or more GUIs provided by the IoT security service 110. As shown, a graph 400 includes an x-axis corresponding to points in time and a y-axis corresponding to a value of a threat level score 402 and a breach likelihood score 404. The 400 further includes boxes representing the detection of facilitators (for example, the box representing facilitator 406) and indicators (for example, the box representing indicator 408) in various time windows. The graph 400 can be generated and caused to be displayed in a web-based GUI, application GUI, or any other interface accessible to a user 112 via an electronic device 118.

As shown in graph 400, the number of facilitators associated with a device or group or devices can change over time. The number of facilitators can change, for example, because of patches of a device's software or firmware or other changes to the runtime behavior of the device. A newly installed patch, for example, might open up new ports or change some other characteristic of the device. As another example, the facilitators associated with a device might change because of a security threat breach itself which, for example, might open or close network ports on the device.

In an embodiment, the determination that the breach likelihood score or threat score crosses a threshold optionally can trigger the generation of one or more security alerts (for example, a notification, an interface something, and so forth). A security alert can be configured to trigger at different threshold levels (for example, whenever a breach likelihood score exceeds thirty percent). Upon receiving an alert or viewing a graph 400, the breach likelihood score associated with a device can help with remediation because it can help determine how aggressively to remediate. If the breach likelihood score for a device is low, for example, an administrator of the device might only perform a scan. If the breach likelihood value is higher, a more detailed scan of an image of the device can be performed offline. If the value is even higher, an administrator might rotate credentials for the device, remotely kill the device, and so forth.

In an embodiment, at circle "4B," the IoT security service 110 can generate one or more IoT device configuration commands sent to the IoT management service 108. The commands, for example, can be used to perform auto-remediation operations in response to detecting certain facilitators, indicators, or in response to a threat level score or a breach likelihood score exceeding a defined threshold. The auto-remediation operations can include, for example, the IoT management service 108 causing one or more IoT devices 104 to be rebooted, to change one or more configurations associated with one or more IoT devices 104, sending software patches or other updates to one or more IoT devices 104, modifying one or more network configurations associated with an IoT device network 106, and so forth.

In an embodiment, an IoT security service 110 can receive requests for additional information related to threat level scores and breach likelihood scores. For example, referring again to FIG. 4, a user can hover over or other select one or more the displayed boxes in the graph to receive information about the facilitator(s) or indicator(s) represented by each box. In other examples, a user can provide input selecting a calculated threat level score or breach likelihood score and the IoT security service 110 can provide in a GUI or other interface a list of the facilitators, indicators, or both, that were used to calculate the score, including information indicating an associated severity with each or other weighing value. Similarly, the content of the security alert generated by the IoT security service 110 can include information indicating to the user details about the facilitators and indicators that contributed to the score.

Figure 5:
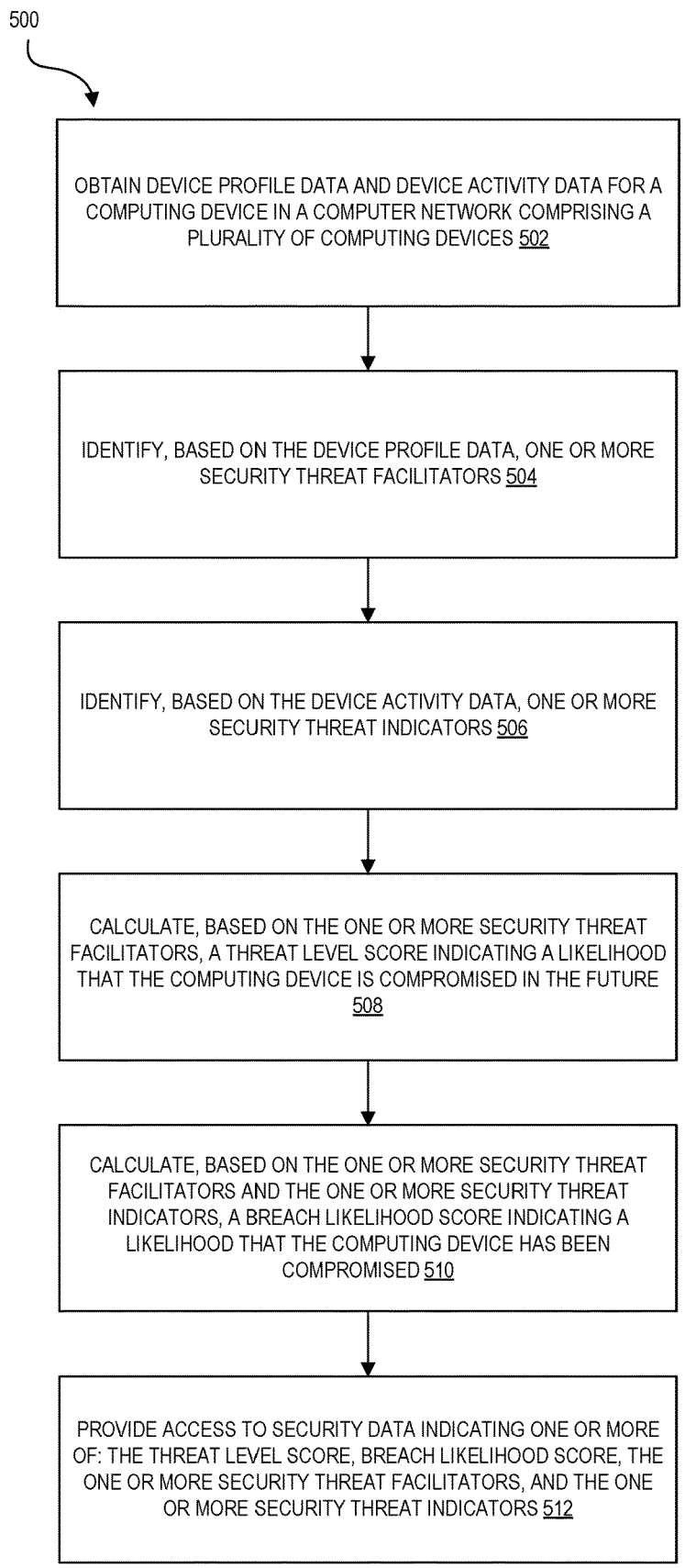
FIG. 5 is a flow diagram illustrating operations of a method for calculating a threat likelihood score and a breach likelihood score for one or more IoT devices in a network environment according to some embodiments.

FIG. 5 is a flow diagram illustrating operations 500 for monitoring and providing security-related information for IoT devices according to some embodiments. Some or all of the operations 500 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by an IoT security service 110 of the other figures.

The operations 500 include, at block 502, obtaining device profile data and device activity data for a computing device in a computer network comprising a plurality of computing device. In an embodiment, the device profile data identifies characteristics of the computing device and the device activity data identifies actions related to the computing device. In an embodiment, the device profile data and the device activity data is obtained using one or more of: an on-device agent running on the device, a network monitor, and an IoT management service of a service provider network. In one embodiment, the computing device is an IoT device that is part of an IoT device network. Referring to FIG. 1, for example, an IoT security service 110 can obtain IoT device data, including device profile data and device activity data, from IoT devices 104 in one or more customer networks 102. The IoT device data 120 can be obtained from one or more of on-device agents 124, one or more network monitors 126, and an IoT management service 108 of the service provider network 100.

The operations 500 further include, at block 504, identifying, based on the device profile data, one or more security threat facilitators. In an embodiment, each of the one or more security threat facilitators represents a potential security threat vector associated with the computing device. As shown in FIG. 2, for example, an IoT security service 110 can identify a security threat facilitator 202 by identifying each of the constituent signals defined for the facilitator.

The operations 500 further include, at block 506, identifying, based on the device activity data, one or more security threat indicators. In an embodiment, each of the one or more security threat indicators represents evidence of a potential security attack. As shown in FIG. 2, for example, an IoT security service 110 can identify a security threat indicator 200 by identifying each of the constituent signals defined for the indicator.

The operations 500 further include, at block 508, calculating, based on the one or more security threat facilitators, a threat level score indicating a likelihood that the computing device is compromised in the future. For example, an IoT security service 110 can calculate the threat level score by analyzing the collected IoT device data 120 for the presence of defined facilitators in defined time windows, identifying various weighting factors associated with each of the identified facilitators, and calculating the threat level score therefrom.

The operations 500 further include, at block 510, calculating, based on the one or more security threat facilitators and the one or more security threat indicators, a breach likelihood score indicating a likelihood that the computing device has been compromised. In an embodiment, calculation of the breach likelihood score is further based on a severity value assigned to at least one of the one or more security threat facilitators and one or more security threat indicators. In one embodiment, calculation of the breach likelihood score is further based on data indicating ongoing security attacks involving at least one of the set of one or more security threat facilitators. In one embodiment, calculation of the breach likelihood score is further based on historical activity data related to the computing device. In one embodiment, calculation of the breach likelihood score is based on data obtained from a plurality of devices in the computer network. For example, an IoT security service 110 can calculate the breach likelihood score by analyzing the collected IoT device data 120 for the presence of defined facilitators and indicators in defined time windows, identifying various weighting factors associated with each of the identified facilitators and indicators, and calculating the breach likelihood score therefrom.

The operations 500 further include, at block 512, providing access to security data indicating the breach likelihood score, the one or more security threat facilitators, and the one or more security threat indicators. For example, the IoT security service 110 can generate a GUI including a graph similar to graph 400 in FIG. 4, or generate any other visual representation the calculated scores. In other examples, the IoT security service 110 can send other types of data (structured data responses, files, and so forth) that indicate one or more of: the threat level score, the breach likelihood score, the one or more security threat facilitators, and the one or more security threat indicators. In yet other examples, the IoT security service 110 can generate various commands based on the threat level, breach likelihood score, facilitators, indicators, or combinations thereof. For example, the commands can be sent to an IoT management service 108, customer network 102, or other location, and cause various actions to occur relative to the relevant IoT devices 104. The actions can include, for example, rebooting one or more IoT devices 104, sending software updates to the devices, modifying one or more network or system configurations associated with the devices, collecting additional information from the devices, and so forth.

In one embodiment, a request is received requesting additional information related to calculation of the breach likelihood score, and information indicating the one or more security threat facilitators and one or more security threat indicators used to calculate the breach likelihood score is caused to be displayed.

Figure 6:
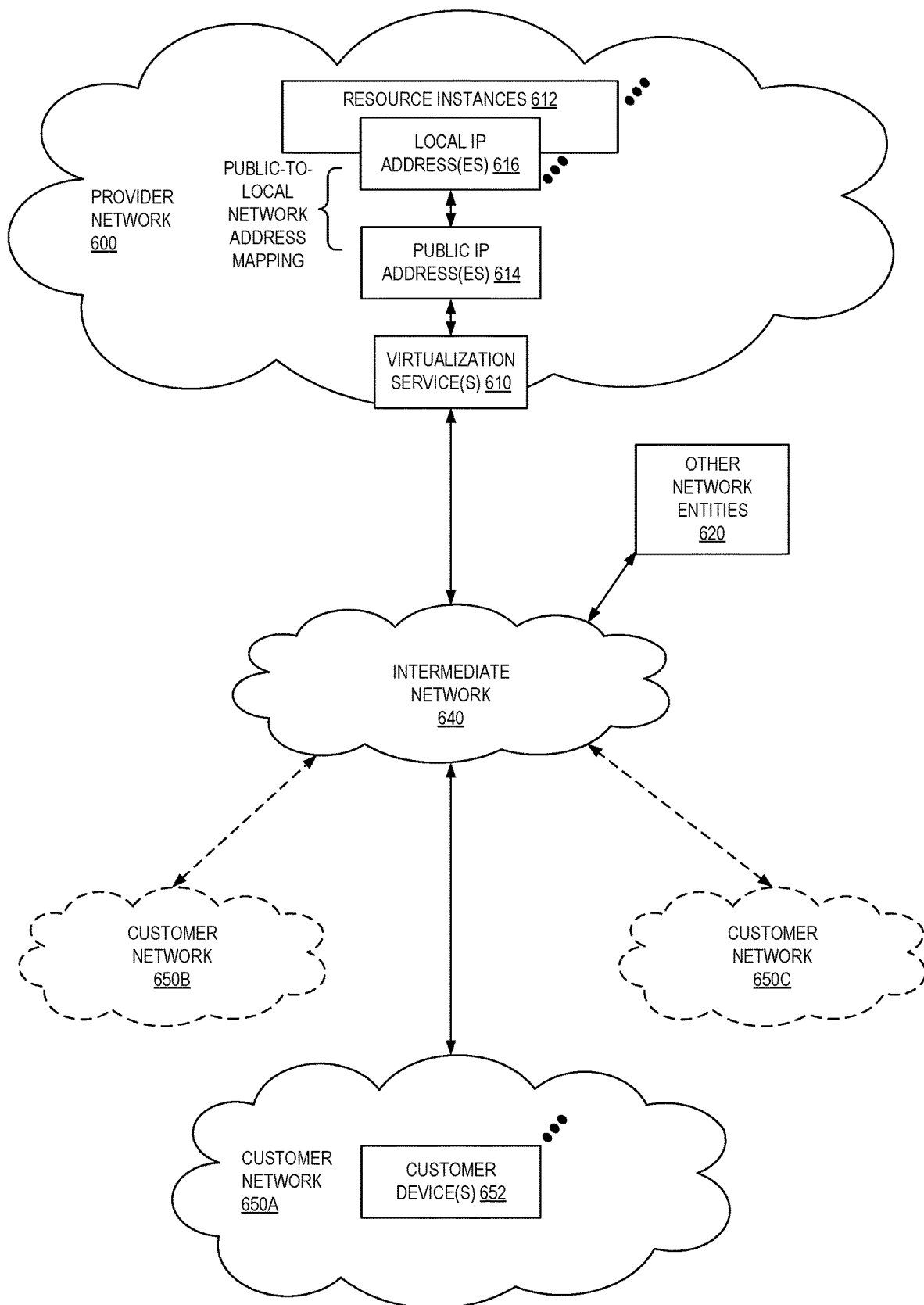
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider network 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
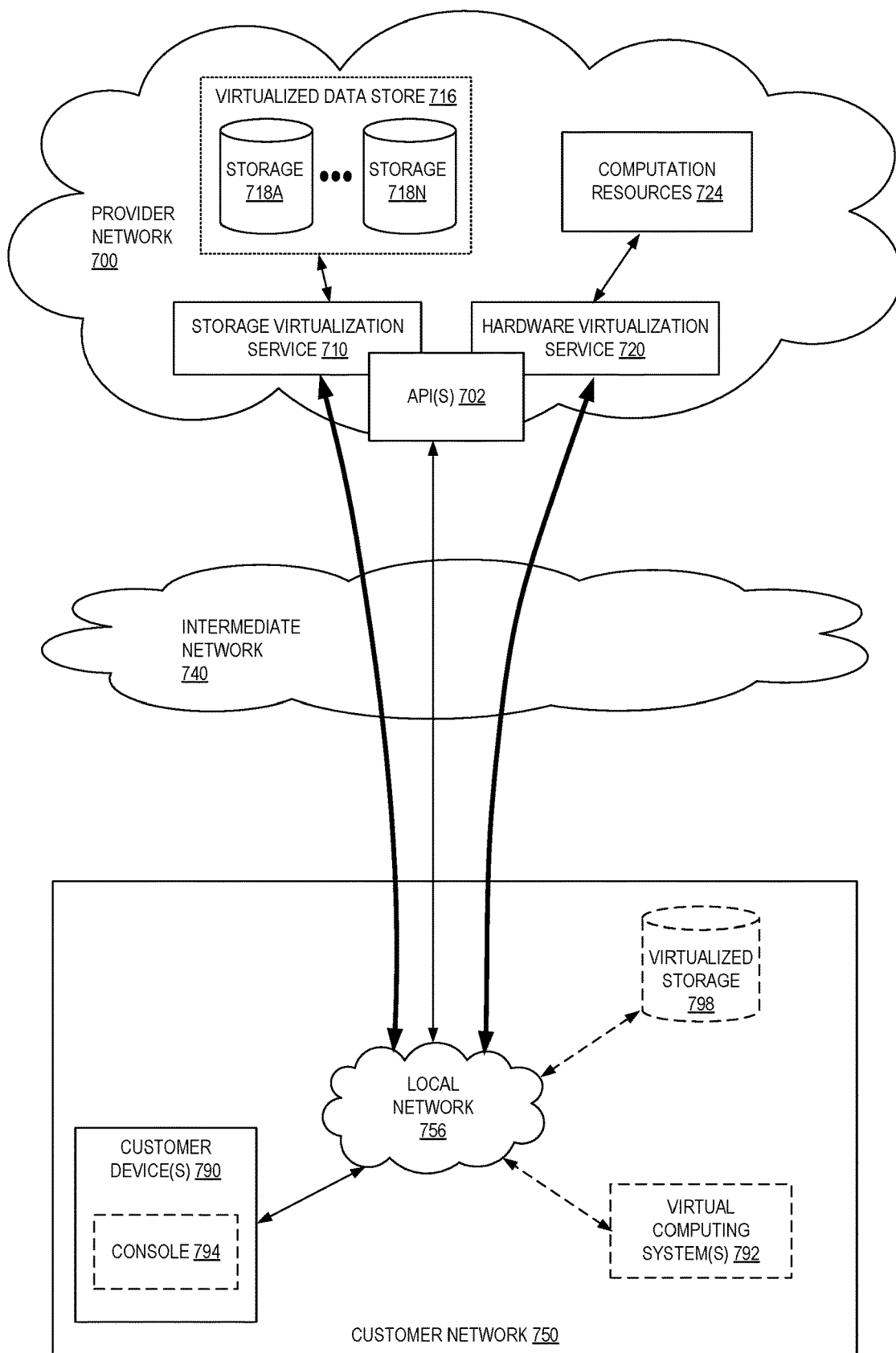
FIG. 7 is a block diagram of an example provider network that provides a storage virtualization service and a hardware virtualization service to customers according to some embodiments.

FIG. 7 is a block diagram of an example provider network that provides a storage virtualization service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage virtualization service 710, for example via one or more APIs 702, to access data from and store data to storage resources 718A-718N of a virtual data store 716 provided by the provider network 700. In some embodiments, a virtualized data store gateway (not shown) may be provided at the customer network 750 that may locally cache at least some data, for example frequently accessed or critical data, and that may communicate with virtualized data store service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes, which appear to the user as local virtualized storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
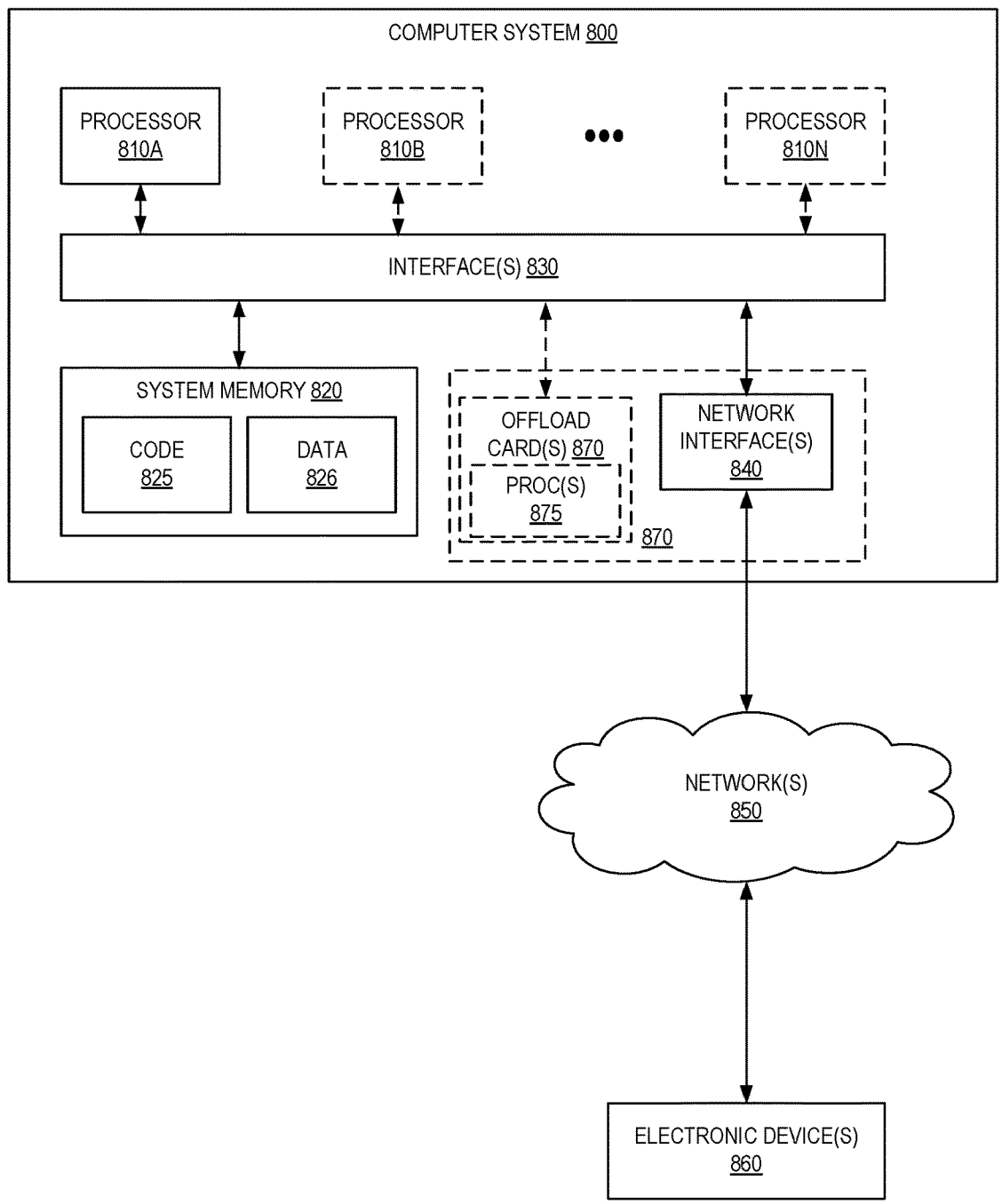
FIG. 8 is a block diagram illustrating an example computer system that may be used in some embodiments.

In some embodiments, a system that implements a portion or all of the techniques for implementing a security system used to monitor and provide security information related to IoT devices as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 8IGNAL 10: In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 204A-204C) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    obtaining, by an Internet of Things (IoT) security service, device profile data and device activity data for a computing device in a computer network comprising a plurality of computing devices, the device profile data identifying characteristics of the computing device and the device activity data identifying actions related to the computing device, and wherein the computing device is an IoT device;
    identifying, based on the device profile data, one or more security threat facilitators, each of the one or more security threat facilitators representing a potential security threat vector associated with the computing device;
    identifying, based on the device activity data, one or more security threat indicators, each of the one or more security threat indicators representing evidence of a potential security attack;
    calculating, based on the one or more security threat facilitators and the one or more security threat indicators, a breach likelihood score indicating a likelihood that the computing device has been compromised; and
    providing access to security data indicating the breach likelihood score, the one or more security threat facilitators, and the one or more security threat indicators.

2. The computer-implemented method of claim 1, further comprising:
    calculating, based on the one or more security threat facilitators, a threat level score indicating a likelihood that the computing device is compromised in the future; and
    wherein the security data further indicates the threat level score.

3. The computer-implemented method of claim 1, wherein the breach likelihood score is calculated further based on device activity data obtained from a plurality of other IoT devices related to the IoT device.

4. A computer-implemented method comprising:
    obtaining, by an Internet of Things (IoT) security service, data related to a computing device in a computer network comprising a plurality of computing devices, wherein the computing device is an IoT device;
    identifying, based on the data, one or more security threat facilitators, each of the one or more security threat facilitators representing a potential security threat vector associated with the computing device, and one or more security threat indicators, each of the one or more security threat indicators representing evidence of a potential security attack;
    calculating, based on the one or more security threat facilitators and the one or more security threat indicators, a breach likelihood score indicating a likelihood that the computing device has been compromised; and
    providing access to security data indicating the breach likelihood score, the one or more security threat facilitators, and the one or more security threat indicators.

5. The computer-implemented method of claim 4, wherein the breach likelihood score is calculated further based on data obtained from a plurality of other IoT devices related to the IoT device.

6. The computer-implemented method of claim 4, further comprising:
    calculating, based on the one or more security threat facilitators, a threat level score indicating a likelihood that the computing device is compromised in the future; and
    wherein the security data further indicates the threat level score.

7. The computer-implemented method of claim 4, wherein the data related to the computing device is obtained using one or more of: an on-device agent running on the computing device, a network monitor, and an IoT management service of a service provider network.

8. The computer-implemented method of claim 4, wherein calculation of the breach likelihood score is further based on a severity value assigned to at least one of the one or more security threat facilitators and one or more security threat indicators.

9. The computer-implemented method of claim 4, wherein calculation of the breach likelihood score is further based on data indicating ongoing security attacks involving at least one of the one or more security threat facilitators.

10. The computer-implemented method of claim 4, wherein calculation of the breach likelihood score is further based on historical activity data related to the computing device.

11. The computer-implemented method of claim 4, further comprising:
    receiving input requesting additional information related to the breach likelihood score; and
    causing display of information indicating the one or more security threat facilitators and one or more security threat indicators used to calculate the breach likelihood score.

12. The computer-implemented method of claim 4, wherein the data includes device profile data including one or more of an indication of a device type, software running on the computing device, software versions running on the computing device, device network configurations, device encryption configurations, and wherein the data further includes device activity data including one or more of network traffic data, application data, file modification data, and device error activity.

13. The computer-implemented method of claim 4, wherein providing access to the security data includes causing display of a graphical user interface (GUI) including a representation of one or more of: the breach likelihood score, the one or more security threat facilitators, and the one or more security threat indicators.

14. The computer-implemented method of claim 4, further comprising generating, based on the breach likelihood score, a command causing one or more actions to occur relative to the computing device, the one or more actions including one or more of: rebooting the computing device, sending a software update to the computing device, modifying one or more network or system configurations associated with the computing device, collecting additional data from the computing device.

15. A system comprising:
    a first one or more electronic devices to implement an Internet of Things (IoT) management service, the IoT management service including instructions that upon execution cause the IoT management service to:
    collect device profile data and device activity data for a computing device in a computer network comprising a plurality of computing devices; and
    send the device profile data and device activity data to an IoT security service; and
    a second one or more electronic devices to implement the IoT security service, the IoT security service including instructions that upon execution cause the IoT security service to:
       obtain the device profile data and device activity data;
       identify, based on the device profile data and device activity data, one or more security threat facilitators, each of the one or more security threat facilitators representing a potential security threat vector associated with the computing device, and one or more security threat indicators, each of the one or more security threat indicators representing evidence of a potential security attack; and
       calculate, based on the one or more security threat facilitators and the one or more security threat indicators, a breach likelihood score indicating a likelihood that the computing device has been compromised; and
       provide access to security data indicating the breach likelihood score, the one or more security threat facilitators, and the one or more security threat indicators.

16. The system of claim 15, wherein the computing device is an IoT device, and wherein the breach likelihood score is calculated further based on device activity data obtained from a plurality of other IoT devices related to the IoT device.

17. The system of claim 15, wherein the IoT security service further includes instructions that upon execution cause the IoT security service to:
    calculate, based on the one or more security threat facilitators, a threat level score indicating a likelihood that the computing device is compromised in the future; and
    wherein the security data further indicates the threat level score.

18. The system of claim 15, wherein providing access to the security data includes causing display of a graphical user interface (GUI) including a representation of one or more of: the breach likelihood score, the one or more security threat facilitators, and the one or more security threat indicators.

19. The system of claim 15, wherein the IoT security service further includes instructions that upon execution cause the IoT security service to:
    receive input requesting additional information related to calculation of the breach likelihood score; and
    cause display of information indicating the one or more security threat facilitators and one or more security threat indicators used to calculate the breach likelihood score.

20. The system of claim 15, wherein the IoT security service further includes instructions that upon execution cause the IoT security service to generate, based on the breach likelihood score, a command causing one or more actions to occur relative to the computing device, the one or more actions including one or more of: rebooting the computing device, sending a software update to the computing device, modifying one or more network or system configurations associated with the computing device, collecting additional data from the computing device.

* * * * *